(12) United States Patent
Staub et al.

(10) Patent No.: US 6,209,912 B1
(45) Date of Patent: Apr. 3, 2001

(54) AIRBAG

(75) Inventors: Andreas Staub, Sulzbach; Frank Sauberlich, Wiesbaden, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/341,154

(22) PCT Filed: Jan. 5, 1998

(86) PCT No.: PCT/GB98/00010

§ 371 Date: Aug. 19, 1999

§ 102(e) Date: Aug. 19, 1999

(87) PCT Pub. No.: WO98/30419

PCT Pub. Date: Jul. 16, 1998

(30) Foreign Application Priority Data

Jan. 6, 1997 (GB) .................................................... 9700134

(51) Int. Cl.[7] .................................................. B60R 21/16
(52) U.S. Cl. ........................................................ 280/743.1
(58) Field of Search ............................... 280/743.1, 743.2

(56) References Cited

U.S. PATENT DOCUMENTS

| 5,094,477 | * | 3/1992 | Togawa | 280/743.1 |
| 5,378,019 | * | 1/1995 | Smith et al. | 280/743.1 |
| 5,547,218 | * | 8/1996 | Kuretake et al. | 280/743.1 |

FOREIGN PATENT DOCUMENTS

| 2257950 | * | 1/1993 | (GB) . |
| WO97/29933 | * | 8/1997 | (WO) . |

* cited by examiner

*Primary Examiner*—Eric Culbreth
(74) *Attorney, Agent, or Firm*—Markell Seitzman

(57) ABSTRACT

An airbag, primarily a driver's airbag, is formed of two, preferably disc shaped pieces of fabric joined at their circumference and having inflation control features including at least two stitch lines each comprising a major portion extending across the body of airbag and a minor central discontinuity in the form of a gap or triangle or peak. Preferably the stitch lines are S shaped and have radial and circumferential aspects.

11 Claims, 2 Drawing Sheets

AIRBAG

BACKGROUND AND SUMMARY OF THE INVENTION

The present invention relates to an airbag for use as a vehicle safety restraint and particularly to an airbag for use on the driver's side of a vehicle.

Driver's side airbags are traditionally mounted in the hub of a steering wheel. They are generally disc-shaped and formed of two pieces of fabric joined around their circumference. A hole is formed in the centre of one of the circular pieces to allow gas to pass into the airbag to inflate it in the event of a crash.

It is desirable in such airbags to control the inflation characteristics so as to limit the maximum extension of the airbag in the direction toward the vehicle driver, and to reduce the velocity of deployment of the airbag in the driver's direction to reduce the potential for injury to the driver from the airbag itself. For occupants sitting close to the airbag module the hazard of injuries are minimised by providing improved deployment kinematics.

Airbag inflation characteristics, including direction and velocity of deployment, are known to be influenced by the way that the airbag is folded into the airbag housing. It is also known that control can be influenced by providing tear lines by stitching through the two pieces of airbag fabric to join the front and back pieces of the airbag together.

U.S. Pat. No. 5,280,154 describes an example of tear line stitch patterns. Various embodiments are shown but in general the tear lines are arranged in concentric coaxial circles about the gas inlet hole. Some additional radial tear lines are also suggested.

However this arrangement does not produce optimum results in terms of smoothness of deployment, low axial deployment (towards the driver) speed, and cushion kinematics. In addition it results in high peak loads on localised areas of the cushion fabric resulting in localised fabric rupture.

It is an object of the present invention to produce an improved airbag particularly for a driver's side.

For a better understanding of the present invention and to show how the same may be carried into effect, reference will now be made to the accompanying drawings, in which:

DETAILED DESCRIPTION OF THE DRAWINGS

In the Figures an airbag 1 for a driver is shown in plan view. The bag comprises two disc-shaped pieces of airbag fabric sewn together around their circumferences 2. A gas inlet hole is indicated at 3 and this will of course only be provided in one of the fabric pieces so as to form a bag with one gas receiving hole.

The upper and lower fabric pieces are additionally stitched to each other along four independent and separate stitch lines 4. The lines 4 cross the airbag body between two points A and B spaced from each other in general along approximately a common circumference as measured from the centre of the airbag 1 (which is also in this example the centre of the gas inlet hole 3).

In all embodiments each stitch line 4 has a small central discontinuity peak 5 at a point closer to the centre of the airbag 1.

Figure 1:
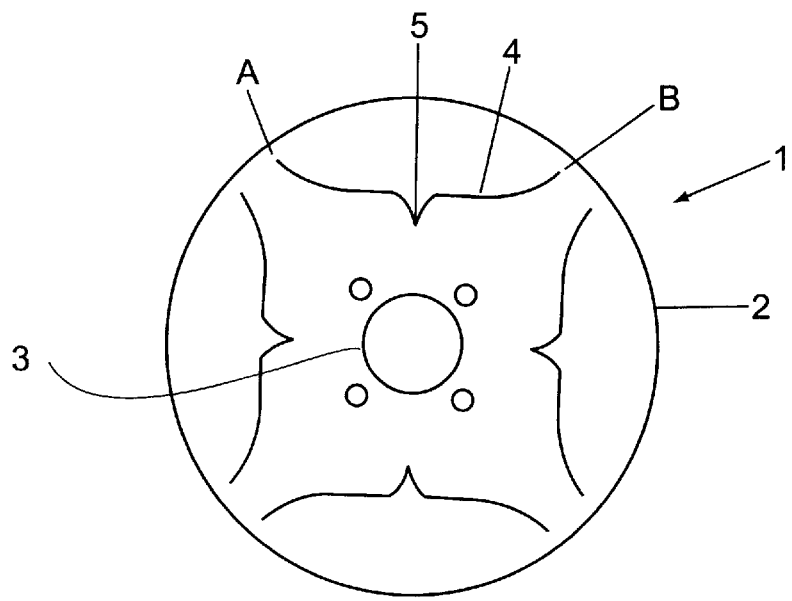
FIGS. 1 to 6 illustrate in plan view six different embodiments of the invention.

In FIG. 1 the four stitch lines 4 are curved in a generally sweeping arc across a quadrant of the airbag. The central discontinuity 5 is in the form of a inwardly pointing triangle. The lines could be considered as taking the general form of back to back S-shapes joined at one end of the letter, with the other ends spaced apart along a common arc.

Figure 2:
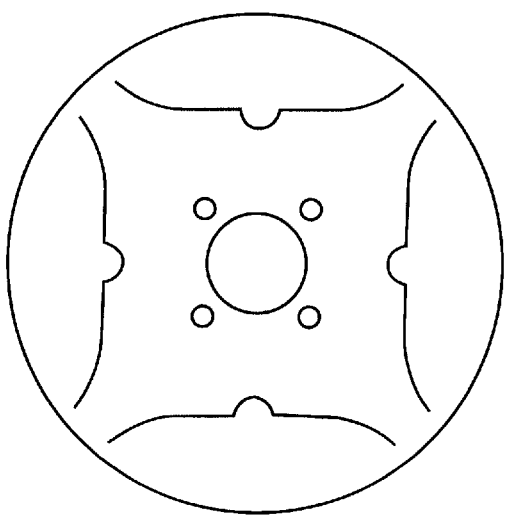

In FIG. 2, the discontinuity 5 is a smooth semi-circle arcing the centre of the airbag.

Figure 3:
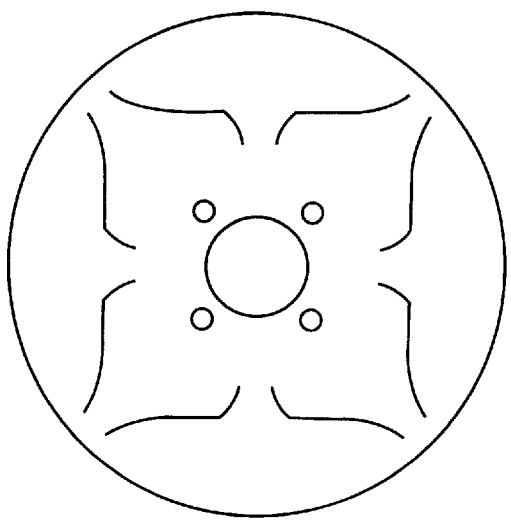

In FIG. 3 the discontinuity 5 is a gap in the curved stitch lines 4. This embodiment has produced particularly favourable test results.

Figure 4:
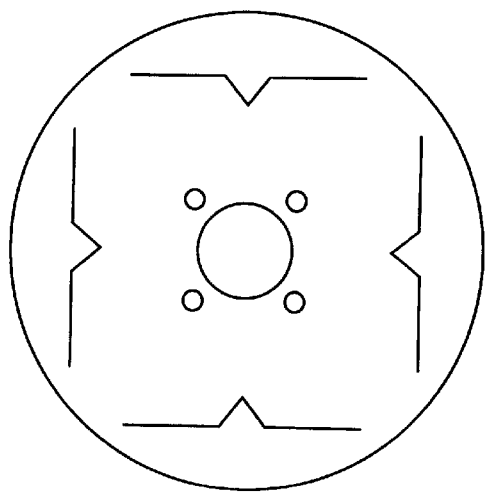
Figure 5:
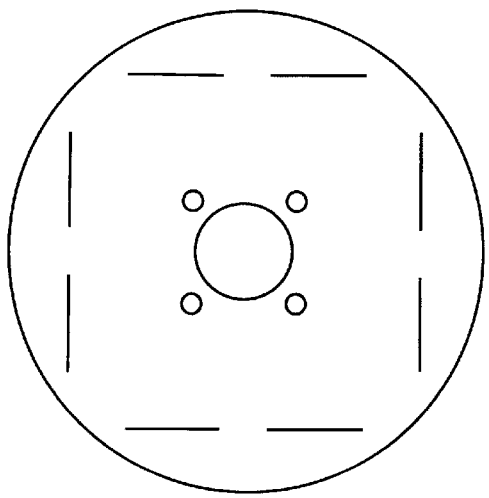

FIGS. 4 and 5 show an embodiment in which the stitch lines are generally straight lines extending across the airbag. In FIG. 4 the discontinuity 5 is a small triangular section with the apex pointing toward the centre of the airbag. In FIG. 5 the discontinuity 5 is a gap in the lines of stitching.

Figure 6:
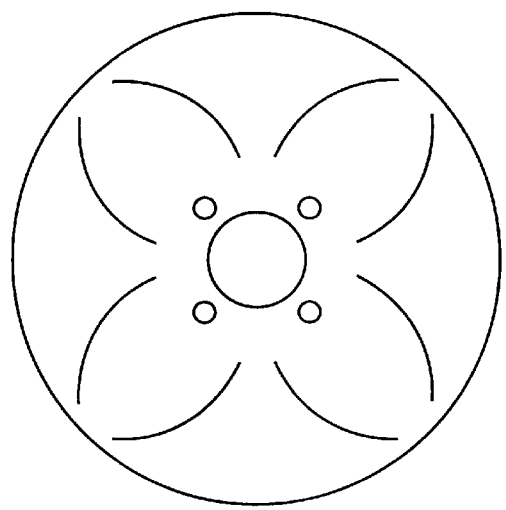

The embodiment of FIG. 6 has arcuate stitch lines arranged in facing pairs generally radially of the airbag.

Of course many different embodiments may be envisaged for stitch lines in accordance with the invention. For example, generally straight lines may be used or curves of various gradients would all be appropriate depending on the inflation characteristics to be achieved and the nature of the inflator.

What is claimed is:

1. An airbag formed of two circumferentially joined pieces of fabric, the two pieces of fabric additionally joined to each other along at least four tear patterns, each one of said tear patterns comprising a major portion extending across the pieces of fabric from a first point to a second point; each tear pattern having a minor generally central portion which forms a discontinuity;

wherein each tear pattern lies generally on a chord and is arranged about 90 degrees from an adjacent tear pattern and wherein the discontinuity is a gap in the tear pattern.

2. An airbag formed of two circumferentially joined pieces of fabric, the two pieces of fabric additionally joined to each other along at least two tear patterns, each one of said tear patterns comprising a major portion extending across the pieces of fabric from a first point to a second point; each tear pattern having a minor generally central portion which forms a discontinuity;

wherein the discontinuity is one of a) a peak or triangle with its apex pointing toward the center of the airbag and b) semi-circular features pointing toward the center of the airbag.

3. An airbag according to claim 2 wherein each of the two pieces of fabric is disc shaped.

4. An airbag formed of two circumferentially joined pieces of fabric, the two pieces of fabric additionally joined to each other along at least two tear patterns, each one of said tear patterns comprising a continuous major portion extending across the pieces of fabric from a first point to a second point; each tear pattern having a minor generally central portion which forms a discontinuity;

wherein each tear pattern has both radial and arcuate aspects.

5. An airbag formed of two circumferentially joined pieces of fabric, the two pieces of fabric additionally joined to each other along at least two tear patterns, each one of said tear patterns comprising a major portion extending across the pieces of fabric from a first point to a second point; each tear pattern having a minor generally central portion which forms a discontinuity;

wherein each tear pattern takes the form of two curving S-shapes each having a joined end and a non-joined end and being joined back to back at corresponding ends of each S-shape so that the major portion of each tear pattern forms an arc curving from the first point to the second point in an opposite direction to the curve of the outer circumference of the airbag.

6. An airbag according to claim 5 wherein the joined ends of the S-shapes form the discontinuity which is in the form of a peak or triangle, and the non-joined ends of the S-shapes are at the first and the second point respectively.

7. An airbag formed of two circumferentially joined pieces of fabric, the two pieces of fabric additionally joined to each other along at least two tear patterns, each one of said tear patterns comprising a major portion extending across the pieces of fabric from a first point to a second point; each pattern having a minor generally central portion which forms a discontinuity;

wherein each tear pattern takes the form of two arcuate curves joined back to back at corresponding ends of each curve so that the major portion of each tear pattern forms an arc curving from the first point to the second point in an opposite direction to the curve of the outer circumference of the airbag.

8. An airbag according to claim 7 wherein the joined ends of the curves form the discontinuity and are in the form of a peak or triangle, and the non-joined ends of the curves are at the first and the second point respectively.

9. An airbag according to claim 7 wherein the joined ends of the curves form the discontinuity and are in the form of a semi-circular pattern, and the non-joined ends of the curves are at the first an the second point respectively.

10. An air bag according to claim 7 wherein each pattern lies generally adjacent an imaginary chord laid about the air bag.

11. An airbag formed of two circumferentially joined pieces of fabric, the two pieces of fabric additionally joined to each other along at least four tear patterns, each one of said tear patterns comprising a major portion extending across the pieces of fabric of the airbag from a first point to a second point; each tear pattern having a minor generally central portion which forms a discontinuity;

wherein the discontinuity is a gap in the tear pattern and wherein each tear pattern takes the form of two arcuate curves, each curve extending outward from opposite sides of the gap and wherein each point on a curve is at an increasing distance.

\* \* \* \* \*